Patented Sept. 5, 1939

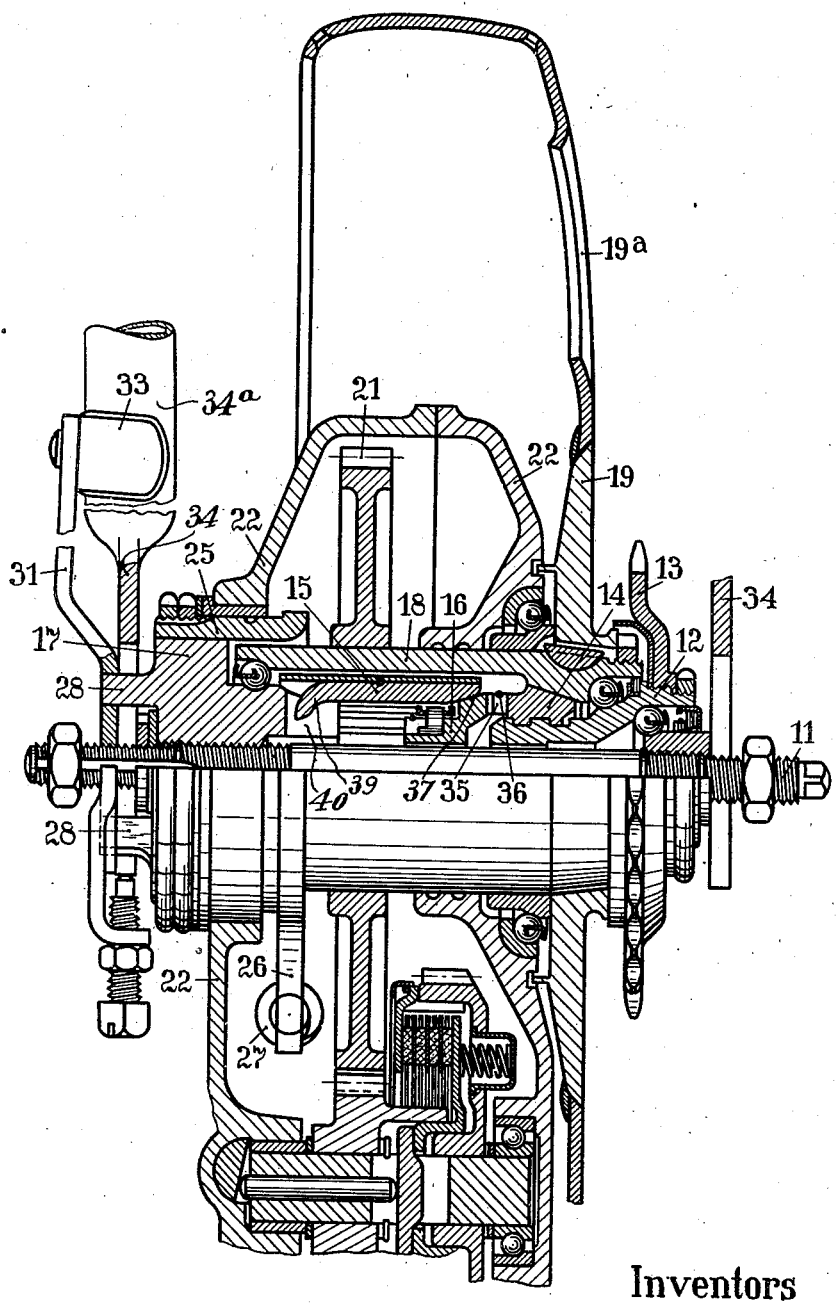

2,171,811

UNITED STATES PATENT OFFICE 2,171,811

FREEWHEEL BRAKE HUB DRIVEN BY A MOTOR MOUNTED IN THE DRIVING WHEEL

Gustav Steinlein, Forsthaus, Mainberg, near Schweinfurt, and Ludwig Bruckmoser, Schweinfurt, Germany Application November 4, 1938, Serial No. 238,726
In Germany December 10, 1937

4 Claims. (Cl. 180—33)

The present invention relates to improvements in a free-wheel brake hub for a bicycle driven by a motor mounted on the driving wheel of said bicycle. In the construction disclosed and claimed in our co-pending application Serial No. 189,420, filed February 8, 1938, the re-acting torque of the motor is resiliently transmitted to a leg of the stationary frame fork by an intermediate member, resiliently loaded by said re-acting torque. This intermediate member is non-rotatably connected to that part of the free-wheel hub prevented from rotating by means of the brake arm, so that the re-action stresses are transmitted to the bicycle frame by the motor and gear casing. This casing is so mounted with respect to the axis of the hub, that it can execute slight rotational oscillations about the axis of the hub, but is prevented from rotating completely about said axis.

As a feature of the present invention, the outer diameter of the brake bearing cone is enlarged radially outwardly beyond the outer circumference of the hub sleeve, and the resiliently loaded member for transmitting the motor re-acting torque to the bicycle frame is rigidly connected directly upon the peripheral surface of said brake bearing cone by means of a sleeve-like portion fixedly embracing said surface. The motor and gear casing enclosing the hub is mounted on this sleeve-like portion to oscillate thereabout.

In this manner the length of the transmitting- and connecting device between the bearing cone and the bicycle frame is reduced and the construction of this device is simplified, so that the pins which by way of the slot provided in the end of the fork project into the recesses of the brake arm may be reinforced whereby favorable influence upon the reliability of operation is effected.

In the accompanying drawing a section through one construction according to the invention is shown by way of example.

Upon the axle 11 of the driving wheel is mounted the free-wheel brake hub, comprising a driving body 12, which may be driven by way of a sprocket wheel 13 from the pedal crank. Mounted upon the circumference of the driving body 12 is a free-wheel clutch, comprising a coupling sleeve 14, screwed upon said body. The hub sleeve 18 may be coupled to said sleeve 14 and in turn to the driving body 12, and the sprocket 13 during drive. Initial back-pedalling operation moves the sleeve 14 to the left as a result of the threaded interengagement of said sleeve 14 and the driving body 12, and causes the drive to be disconnected and free-wheeling to come into play. Further back-pedalling causes application of the brake. The brake comprises a bearing and brake cone 17 non-rotatably fixed upon the axle 11, and forming the stationary part of the free-wheel hub, a lengthwise slit brake sleeve 15, capable of being expanded, and a slidable expanding and coupling cone 16, which is connected to the coupling sleeve 14 by means of claws 35. These claws 35 are maintained in inter-engagement by means of a sprung ring 36, so that during drive the displaceable cone 16 is withdrawn from expanding engagement with the brake sleeve 15. The coupling cone 16 has a conical surface engagement with the right hand end of the brake sleeve 15 at 37. To hold this brake sleeve 15 against rotation, said sleeve has a pair of diametrically arranged dogs 39, projecting into corresponding slots 40 respectively of the stationary cone 17.

Upon back-pedalling operations, beyond the initial stage above referred to, the resultant rotation of the driving body 12 causes axial movement of the coupling sleeve 14 to the left due to its threaded engagement with said driving body. Due to the conical end engagement of the brake sleeve 15 with the coupling cone 16 at 37, the axial movement of the coupling sleeve 14 to the left will expand said brake sleeve in position to hold the hub sleeve 18 against rotation. The free wheel hub brake as so far described is of known construction, and the details and operation thereof may be similar to those shown in the Winkler Patent No. 2,066,504, issued January 5, 1937.

As a feature of the present invention, a portion of the bearing cone 17 is enlarged in outer diameter in such a manner, that it projects slightly radially outwardly beyond the outer circumference of the hub sleeve 18. A sleeve 25, extending over the hub sleeve 18, is non-rotatably fixed upon the said portion of the bearing cone 17 by clamping, press fitting or wedging not shown in the drawing, or by any other means. The free end of an arm or lever 26 integral with or otherwise rigidly connected to the sleeve or sleeve-like portion 25 at the other end of said lever, extends into the gear casing 22 and bears, in both directions of rotation, against this casing by means of resilient members such as springs 27. The casing 22 is relatively rotatably mounted on the one hand upon the peripheral surface of the hub sleeve 18 by means of ball bearings and on the other hand upon the sleeve 25 and encloses the motor (not shown), which is desirably of the internal combustion type, and which is mounted in said casing by any suitable means. In this manner the re-acting torque of the motor is elastically transmitted to the bearing- and expanding cone 17 from which this torque and the torque of the braking couple are transmitted to the bicycle bar frame 34a by means of the brake arm 31 mounted upon pins 28 of the cone 17 and having U-shaped holding claw 33. This claw straddles the bicycle bar frame 34a which latter has the fork end 34. The brake arm 31 also carries the chain-tensioning appliance.

The motor drive is transmitted, by means of an intermediate gear, to a gear wheel 21 rigidly fixed upon the hub sleeve. A flange 19 to which the spoke drum 19a is welded or connected in any other manner, is, by means of a wedge, non-rotatably fixed upon the hub sleeve.

The new arrangement for transmitting the motor re-action moment and the moment of the braking couple is substantially strengthened with regard to the construction shown in our above-mentioned co-pending application Ser. No. 189,420. The diameter of the brake cone 17 is enlarged over the circumference of the hub sleeve 18 and the arm or lever 26 is rigid with the sleeve 25, which is non-rotatably fixed upon the circumference-surface of the said cone 17. Consequently the pins 28, extending through the end of the fork 34 into the recesses of the brake arm 31, may be shortened and made of larger cross section, so that the connection to the frame warrants greater reliability.

Owing to the resilient support of the casing 22 the motor may be started by the pedal cranks without jerking.

What we claim is:

1. In a bicycle of the type having a vehicle frame and a motor for driving said bicycle, a free wheel brake hub mounted on the axle of the driving wheel of the bicycle, and comprising a hub sleeve, and a stationary brake part with its outer circumference extending radially outwardly beyond the outer periphery of said hub sleeve, a lever having one end affixed against rotation to the outer circumference of said brake part, a casing for said motor enclosing at least a portion of said brake hub, and mounted for oscillatory movement substantially about the axis of said brake hub, said casing receiving the reactive torque stresses of said motor, resilient means between said casing and said lever for resiliently transmitting the reactive stresses of said motor from said casing to said lever and in turn to said stationary part, and means for transmitting these stresses from said stationary part to the bicycle frame.

2. In a bicycle of the type having a vehicle frame and a motor for driving said bicycle, a free-wheel brake hub mounted on the axle of the driving wheel of said bicycle, and comprising a hub sleeve, and a stationary brake part with its outer circumference extending radially outwardly beyond the outer periphery of said hub sleeve, a lever having a sleeve-like portion embracing the outer circumference of said brake part, and affixed thereto against rotation, a casing for said motor, rotatably mounted upon said sleeve-like portion for oscillatory movement thereabout, and receiving the reactive torque stresses of said motor, resilient means between said casing and said lever for resiliently transmitting the reactive torque stresses of said motor from said casing to said lever and in turn to said stationary part, and means for transmitting these stresses from said stationary part to the bicycle frame.

3. In a bicycle of the type having a vehicle frame and a motor for driving said bicycle, a free-wheel brake hub mounted on the axle of the driving wheel of said bicycle, and comprising a hub sleeve, and a stationary brake part with its outer circumference extending radially outwardly beyond the outer periphery of said hub sleeve, a lever having a sleeve-like portion embracing the outer circumference of said brake part, and affixed thereto against rotation, a casing for said motor, rotatably mounted upon said sleeve-like portion for oscillatory movement thereabout, and receiving the reactive torque stresses of said motor, resilient means between said casing and said lever for resiliently transmitting the reactive torque stresses of said motor from said casing to said lever and in turn to said stationary part, means for transmitting these stresses from said stationary part to the bicycle frame, an annular flange affixed to said hub sleeve for rotation therewith, and a spoke drum fixed to said annular flange.

4. In a bicycle having a vehicle frame and a motor for driving said bicycle, a free-wheel brake hub mounted on the axle of the driving wheel of the bicycle, and comprising a hub sleeve, and a stationary brake part with its outer periphery extending radially outwardly beyond the outer periphery of said hub sleeve, a lever having one end affixed against rotation to the outer periphery of said brake part, resilient means between the motor and said lever for resiliently transmitting the reactive torque of the motor to said lever and in turn to said stationary part, and means for transmitting these stresses from said stationary part to the bicycle frame.

GUSTAV STEINLEIN.
LUDWIG BRUCKMOSER.